(12) United States Patent  (10) Patent No.: US 7,543,890 B1
Sasaki et al.  (45) Date of Patent: Jun. 9, 2009

(54) STRUCTURE OF FOLD-DOWN AUTOMOTIVE SEAT

(75) Inventors: Katsuhiko Sasaki, Tokyo (JP); Hideya Shiotani, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 12/129,405

(22) Filed: May 29, 2008

(51) Int. Cl.
 *B60N 2/02* (2006.01)
(52) U.S. Cl. .............................. 297/378.12; 297/378.1; 297/378.14
(58) Field of Classification Search .............. 297/378.1, 297/378.12, 378.14
 See application file for complete search history.

(56) References Cited

U.S. PATENT DOCUMENTS

| | | | |
|---|---|---|---|
| 6,113,190 A * | 9/2000 | Negi et al. | 297/378.1 |
| 7,066,543 B2 * | 6/2006 | Yu | 297/378.12 |
| 7,152,923 B2 * | 12/2006 | Charras et al. | 297/378.12 |
| 7,344,195 B2 * | 3/2008 | Folkert et al. | 297/378.1 |
| 2005/0015929 A1 * | 1/2005 | Aufrere et al. | 16/337 |

FOREIGN PATENT DOCUMENTS

| | | |
|---|---|---|
| JP | 2000-102438 A | 4/2000 |
| JP | 2007-050765 A | 3/2007 |

* cited by examiner

*Primary Examiner*—Laurie K Cranmer
(74) *Attorney, Agent, or Firm*—Browdy and Neimark, P.L.L.C.

(57) ABSTRACT

A fold-down automotive seat with spiral spring element for biasing a seat back thereof towards a seat cushion thereof is of such a structure wherein a first engagement element is fixedly disposed on the seat back side, whereas a second engagement element fixed to a base plate on the seat cushion side. The second engagement element is situated at a predetermined point forwardly of and distant from the first engagement element. One movable end of the spring element is normally engaged with the first engagement element. Upon folding down the seat back, such movable end of spiral spring element is engaged with the second engagement element, which blocks application of biasing force of the spring element to the seat back, whereupon the seat back is temporarily stopped at the afore-said predetermined point and prevented from being abruptly folded down onto the seat cushion.

2 Claims, 3 Drawing Sheets

STRUCTURE OF FOLD-DOWN AUTOMOTIVE SEAT

BACKGROUND OF THE INVENTION

1. Field of the Invention

The present invention relates to a fold-down automotive seat of the type wherein a seat back thereof may be inclined forwardly and further folded down under biasing force of a spring element onto a seat cushion thereof. In particular, the invention is directed to a structure of such fold-down automotive seat for allowing the seat back to be folded downwards under the biasing force of the spring element, while causing the seat back to stop temporarily at a predetermined point prior to the seat back being folded onto the seat cushion.

2. Description of Prior Art

Most of fold-down automotive seats is provided with a reclining device operable for causing a seat back thereof to incline forwardly of the seat and further fold down onto a seat back. Typically, the reclining device is operatively connected between a lower end of one lateral frame member of seat back frame and a base plate fixed to the seat cushion or to a floor of vehicle. The reclining device includes a connecting tube which is firmly connected between two lateral frame members of seat back frame, so that operation of the reclining device is transmitted via the connecting tube to both of the two lateral frame members, thereby causing both two seat back frame's lateral frame members or a seat back to rotate forwardly and backwardly in adjustable manner. For that purpose, the reclining device has a locking mechanism provided with a control lever (the so-called recliner), which is operable by the control lever to either place the seat back in a locked state or release the seat back from the locked state.

In the fold-down seat of this kind, a coil torsion spring or spiral spring is typically used as a means for giving a biasing force to the seat back in the forward direction of seat in order to enable a user to easily and quickly fold the seat back onto the seat cushion. As is known, the spiral spring has a stationary inward end disposed adjacent to a center thereof and a movable outward end disposed circumferentially thereof. As for example disclosed from the Japanese Laid-Open Patent Publication No 2000-102438, a spiral spring is mounted in the above-stated kind of reclining device, such that the stationary inward end thereof is secured to a securing lug formed in a reclining device connected with a base plate fixed on the side of seat cushion frame, whereas the movable outer end thereof is secured to a securing lug formed on an upper arm connected with a lateral frame member of seat back frame. In this prior art, the reclining device has a locking mechanism for locking the upper arm or the seat back at a desired position against the biasing force of the spiral spring. By operating a control lever of that locking mechanism, a user can adjustingly incline the seat back at a desired angle between forward and backward inclination limit points of seat back.

Most of rear seats is also a fold-down seat of this kind having the foregoing reclining device and spiral biasing spring, with a view to allowing a user to fold the seat back thereof forwardly onto the seat cushion thereof, so that a whole back surface of that seat back lies horizontally upon the seat cushion to provide a load-carrying platform in the backward cabin area of automobile.

However, in such rear seat, the spiral spring always gives a great biasing force attempting to cause forward rotation of the seat back, which has raised the problem that, upon unlocking operation of the locking mechanism of reclining device, the seat back will abruptly rotate forwardly under the great biasing force of spiral spring, and therefore it is of a high likelihood that the seat back may strongly hit a user or cause an unexpected serious trouble.

To avoid the dangerous abrupt inclination of seat back, a damper means has been used for making slow or gentle the biased inclination of seat back when the locking mechanism is operated to unlock the seat back. In this regard, the Japanese Laid-Open Patent Publication No. 2007-050765 teaches a stopper pin formed on the side of a seat back and a movable damper element having an arcuate guide slit. According thereto, when a user unlocks the seat back and the seat back is about to be quickly folded forwardly toward a seat cushion under a biasing force of spring, the stopper pin is displaced along the arcuate guide slit of the movable damper element, while being in a frictional contact with both two edges of that particular arcuate guide slit. The movable damper element is also moved together with the seat back being folded down, and therefore a certain resistance is given to the forward and downward movement of seat back being folded down toward the seat cushion, thereby making slow and gentle the forward movement of the seat back. Hence, it is possible to avoid the abovementioned abrupt forward folding of seat back as well as the serious troubles incidental thereto.

But, such provision of movable damper element makes the structure of seat complicated and large in size and therefore becomes unfavorable in view of the recent demand for weight light and small-sized structure of automotive seat. Further, the movable damper element is not designed to stop the forward inclination of seat back to a horizontal folded-down position where it rests on a seat cushion, with the result that, a precious item placed on the seat cushion will be strongly hit by the downwardly moved seat back and sandwiched between that seat back and the seat cushion under the biasing force of spring. This may result in the item being damaged or broken. Still further, since the seat back always receives the forward biasing force of spring, when trying to return the thus-folded seat back to a normal use position, it is necessary or quite troublesome for a user to use his or her force overcoming the biasing force of spring to move the seat back upwardly to the normal use position.

SUMMARY OF THE INVENTION

In view of the above-stated drawbacks, it is a purpose of the present invention to provide an improved arrangement of fold-down automotive seat which is much simplified, without requiring the aforementioned damper element, to insure preventing a seat back from being abruptly folded down onto a seat cushion.

To achieve such purpose, in accordance with the present invention, there is provided a structure of automotive seat of fold-down type allowing a seat back thereof to be folded down onto a seat cushion thereof, which basically comprises:

- a seat back frame member provided in the seat back;
- a base plate disposed at the seat cushion;
- the seat back frame member being rotatably connected with the base plate so as to be inclinable in either of a forward direction of the automotive seat and a backward direction of the automotive seat;
- a limit means for defining a backward limit point for limiting rotation of the seat back frame or the seat back in the backward direction of the automotive seat;
- a first engagement element formed in the seat back frame member;
- a second engagement element formed in the base plate, the second engagement element being disposed at a predetermined point distant from the first engagement element in the forward direction of the automotive seat;

a spiral spring element adapted for giving a biasing force to the seat back frame member to thereby biasingly cause the seat back to rotate in the forward direction of the automotive seat towards the seat cushion; and the spiral spring element having: a stationary inward end portion defined centrally thereof, the stationary inward end portion being securely connected with the base plate; and a movable outward end portion defined circumferentially thereof, the movable outward end portion being releasably engaged with the first engagement element;

wherein the biasing force of the spiral spring element is effectively applied to the seat back frame member insofar as that particular seat back frame member is positioned within a range between the backward limit point and the predetermined point, and wherein rotation of the seat back frame in the forward direction causes simultaneous displacement of the first engagement element, which in turn allows the movable outward end portion of the spiral spring element to be displaced under the biasing force, together with the first engagement element, in a direction toward the second engagement element, and then, engagement of the movable outward end portion with the second engagement element, ceases application of the biasing force to seat back frame member, whereupon the seat back is stopped temporarily at the predetermined point while on the other hand allowing the first engagement element to be disengaged from the movable outward end portion of the spiral spring element, to thereby allow the seat back frame or the seat back to be folded down from the predetermined point towards the seat back.

As one aspect of the present invention, a reclining device may be operatively connected between the seat back frame member and the base plate, the reclining device having: a means for defining a forward limit point for limiting rotation of the seat back frame or the seat back in the forward direction of the automotive seat; and the afore-said limit means for defining the backward limit point. The reclining device is operable to adjustingly incline the seat back frame member or the seat back within a predetermined range between the forward limit point and the backward limit point, wherein the forward limit point corresponds to afore-said predetermined point where the second engagement element is disposed.

Other features and advantages of the present invention will become apparent from reading of the descriptions, with reference to the annexed drawings.

DETAILED DESCRIPTION OF PREFERRED EMBODIMENT OF THE INVENTION

Referring to FIGS. 1 to 7, there is illustrated one exemplary mode of structure of fold-down automotive seat, as generally designated by (10), in accordance with the present invention.

Figure 1:
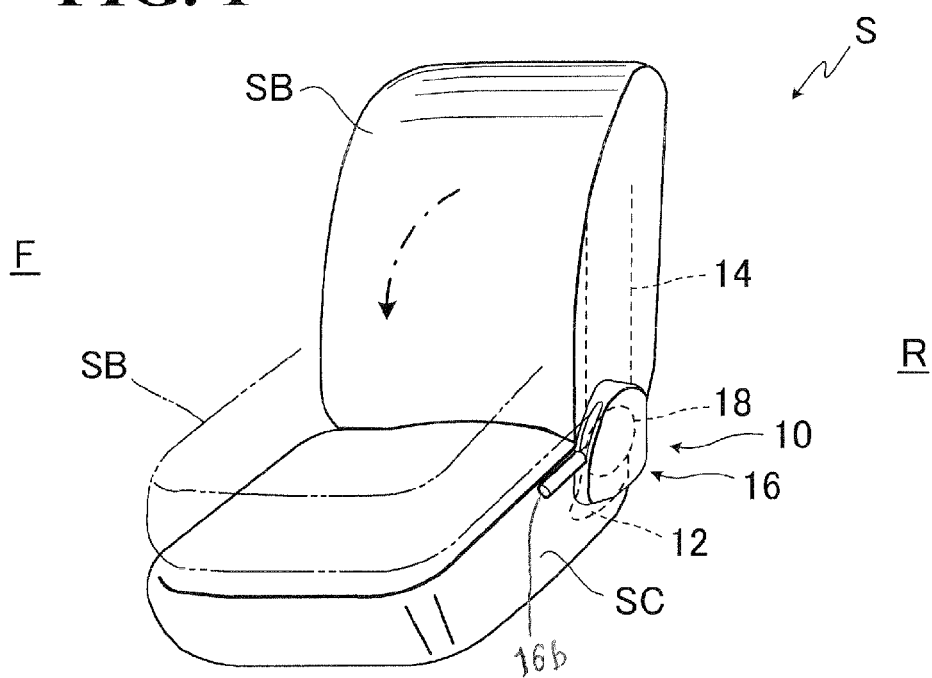
FIG. 1 is a schematic perspective view of a fold-down automotive seat to which the present invention is applied.

FIG. 1 shows a fold-down automotive seat (S) provided with a reclining device (16). Needless to mention, the seat (S) is formed by a seat back (SB) and a seat cushion (SC). While not shown, it is to be naturally understood that the seat back (SB) has a seat back frame provided therein, while the seat cushion (SC) has a seat cushion frame provided therein, as commonly known in the field of automotive seat.

It is noted that the term, "forward", "ahead" or "forwardly", refers to a direction towards a forward side (F) facing forwardly of the seat (S), whereas the term, "backward" or "backwardly", refers to a direction towards a backward side (R) facing backwardly of the seat (S).

The reclining device (16) itself is known in the art, which has a control lever (16b) and a locking mechanism (16c), and operatively connected between the seat back (SB) and the seat cushion (SC). Designation (16a) denotes a drive shaft of the reclining device (16). While not clearly shown, it is known that the drive shaft (16a) is at one end portion thereof operatively connected with the locking mechanism (16c) and at another end portion thereof fixedly connected with the control lever (16b). The central axis of the drive shaft (16a) forms a center of rotation about which the seat back frame or the seat back (SB) is to be rotated forwardly and backwardly in a direction towards and away from the seat cushion (SC).

The locking mechanism (16c) is also known well in the art, and any specific description thereof is eliminated for the sake of simplicity in description. Briefly stated, as is known, the locking mechanism (16c) may be actuated by a locking operation of the control lever (16b) to place the reclining device (16) in a locked state, thereby locking the seat back (SB) against movement at a given point, and also be actuated by an unlocking operation of the control lever (16b) to release the reclining device (16) from the locked sate, thereby allowing the seat back (SB) to be rotatable forwardly and backwardly in a direction toward and away from the seat cushion (SC).

As far as the present embodiment is concerned, the reclining device (16) is operatively connected between a base plate (12) disposed in the seat cushion (SC) and a lower end portion of a seat back frame member (14) provided in the seat back (SB). Though not shown, the base plate (12) may be fixed to a floor of vehicle or a slide rail device. Designation (12c) denotes a reinforcing flange portion integrally extending at right angle from the lower region (12d) of the based plate (12). Designation (13) denote a reinforcing bead formed in the base plate lower region (12d).

As is known, the reclining device (16) has a spiral spring element (18) provided therein, the spiral spring element (18) being adapted for giving a forward biasing force to the seat back (SB) for the purpose of biasingly causing the seat back (SB) to rotate forwardly relative to the drive shaft (16a) in a direction to the seat cushion (SC). Hence, simply from the viewpoint of conventional mechanism, it is to be understood that, under the biasing force of spiral spring element (18), by controlled unlocking operation of the reclining device (16), a user can allow the seat back (SB) to be automatically inclined to a desired inclined point within a predetermined range of forward and backward reclining angles, and also, when the user effects full unlocking operation of the reclining device (16), the seat back (SB) is automatically folded down onto the seat cushion (SC), which however results in the problems stated in the foregoing description of prior art.

Figure 4:
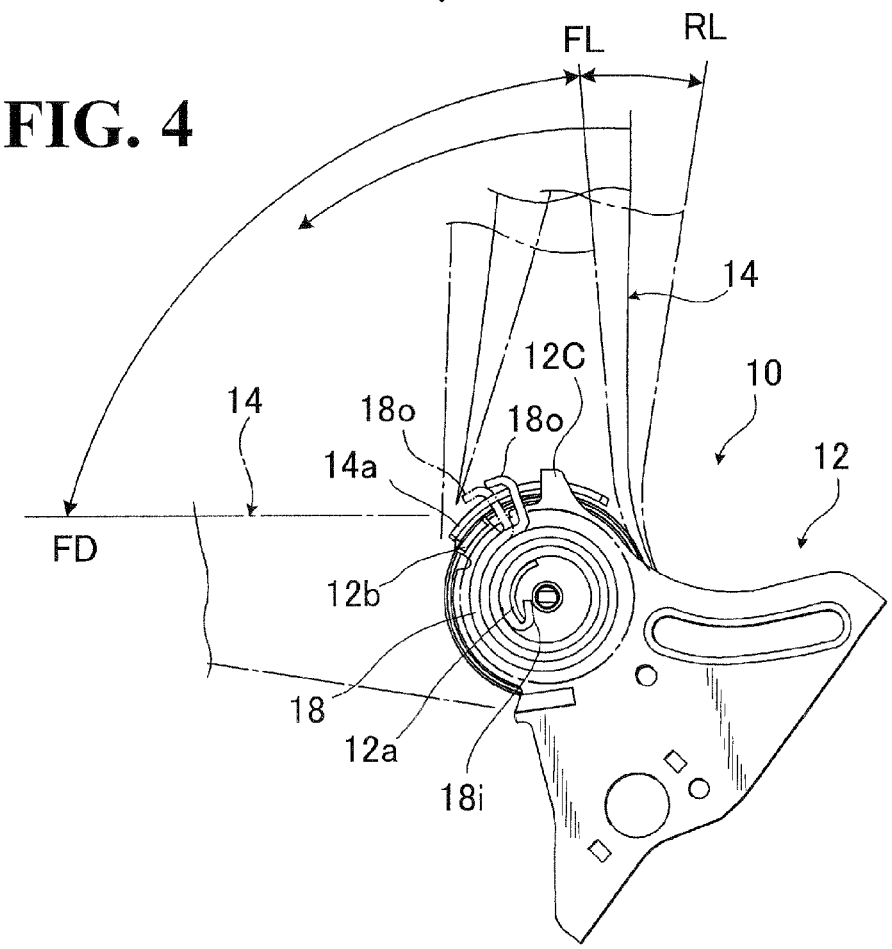
FIG. 4 is a diagram for explanatorily showing how the principal part of the invention works.

In this respect, the forward and backward reclining angles of the seat back (SB) are limited as indicated by the two respective designations (FL) and (RL) in FIG. 4. In other words, as seen in that FIG. 4, the seat back (SB) (i.e. the seat back frame member (14)) can be adjustingly inclined by operation of the reclining device (16) within a certain angle of inclination between the forward limit point (FL) and the backward limit point (RL). It is noted that, while not clearly illustrated, the backward limit point (RL) is defined to be a point where a backward edge (14a-3) of the undermentioned first engagement (14a) is contacted with a stopper portion (12C) formed in the base plate (12). The forward limit point (FL) is at a point corresponding to a second engagement point (12b) to be described later, as far as the illustrative embodiment is concerned.

In accordance with the present invention, generically stated, a first engagement element (14a) and a second engagement element (12b) are provided for engagement with an outward movable end portion (18o) of the spiral spring element (18), as a novel characteristic feature of the invention, which will be elaborated later.

The spiral spring element (18) has a stationary inward end portion (18i) disposed centrally thereof, and a movable outward end portion (18o) projecting from the outer circumference thereof. Specifically, as shown, the stationary inward end portion (18i) is of a hook shape for a stationary securing purpose to be set forth, whereas on the other hand, the movable outward end portion (18o) is of a generally inverted-L-shaped configuration extending outwardly at a right angle from the outer circumference of the spring element (18) and terminating in a forwardly extending horizontal distal end part (18oE).

Figure 2:
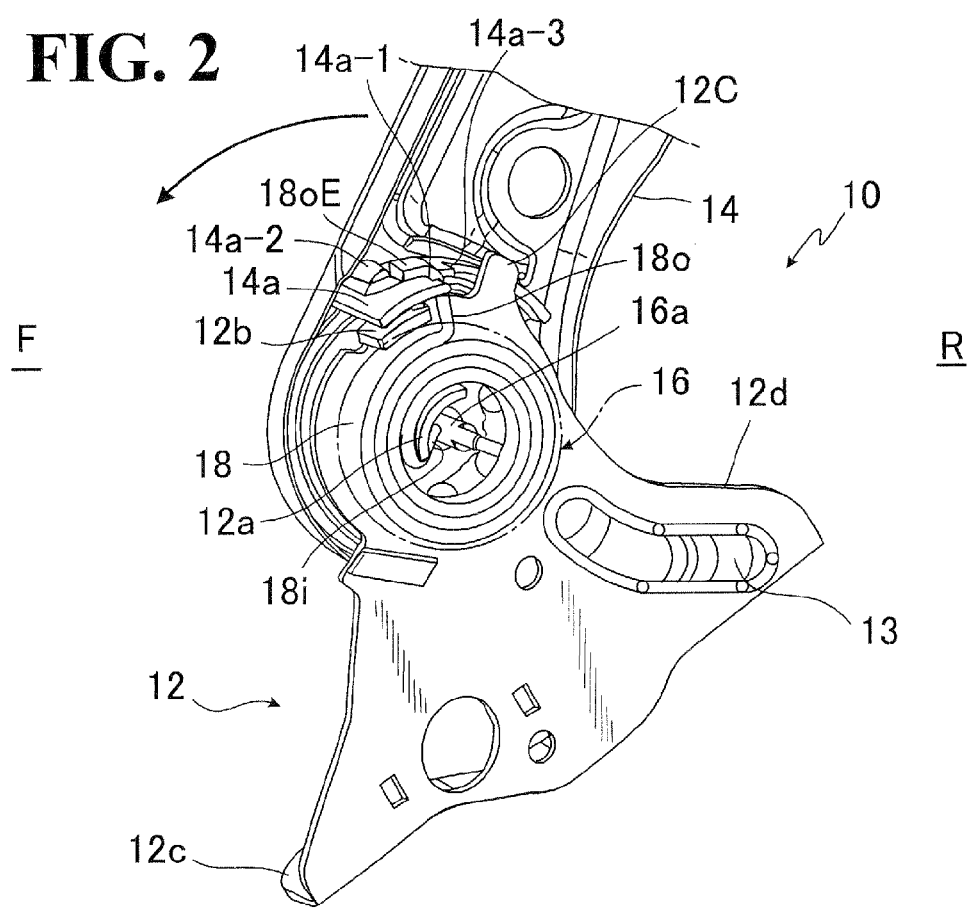
FIG. 2 is a partly broken schematic perspective view showing a principal part of the present invention.

As seen in FIG. 2, an arcuate securing piece (12a) is formed integrally in the upper region of the base plate (12) (where the reclining device (16) is provided) so as to arcuately extend adjacent to the drive shaft (16a) (i.e. a center of the reclining device (16)) and along a circle having its center at the central axis of that drive shaft (16a).

Securely engaged with such arcuate securing piece (12a) is the stationary inward end portion (18i) of spiral spring element (18) which is thus retained stationary against movement. In this regard, it is observed that the spring element (18) has a certain arcuate end region extending continuously from that stationary inward end portion (18i) thereof. Such certain arcuate end region is shown to be closely contacted on and about an entire outer surface of the arcuate securing piece (12a). This is advantageous in making the resilient action of spiral return spring (18) smooth and uniform to thereby provide the spring (18) itself with a stable and sufficient biasing force.

Figure 3:
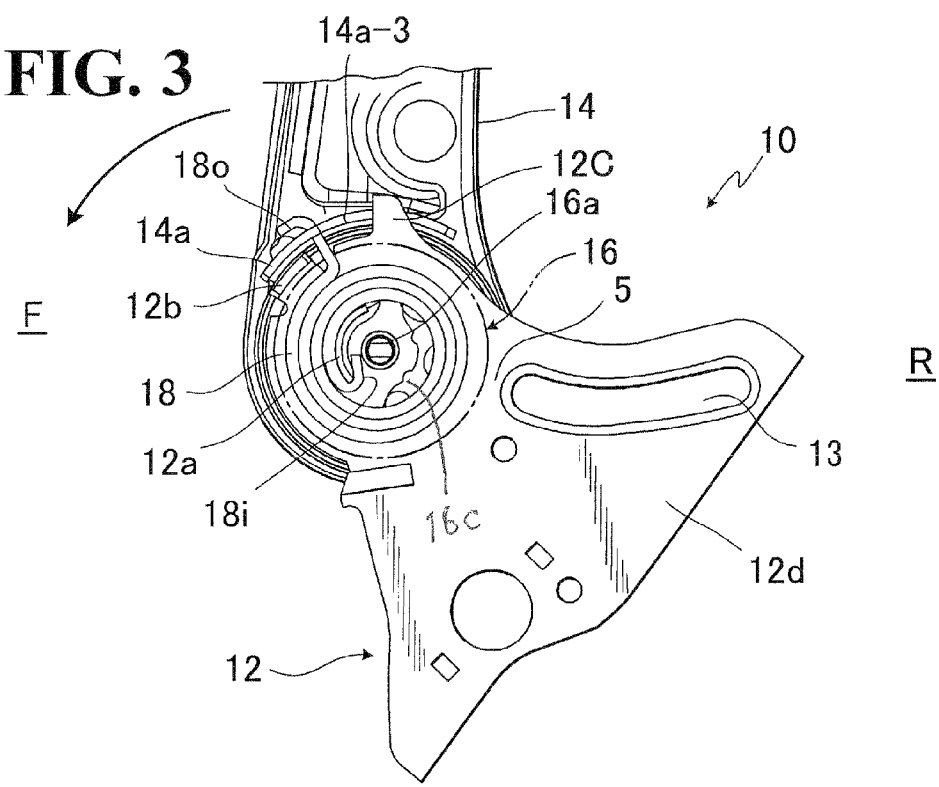
FIG. 3 is a partly broken elevational side view showing the principal part of the present invention.

As seen in FIGS. 2 and 3, the aforementioned first engagement element (14a) is formed integrally in the seat back frame member (14) at a predetermined point above and adjacent to the spiral spring element (18), and, under the biasing force of that spring element (18), the movable outward end portion (18o) thereof is normally biased to engagement with the first engagement element (14a). Thus, the seat back frame member (14) is biasingly caused by the spiral spring element (18) to rotate in the forward direction relative to the center of rotation (at 16a).

Figure 5:
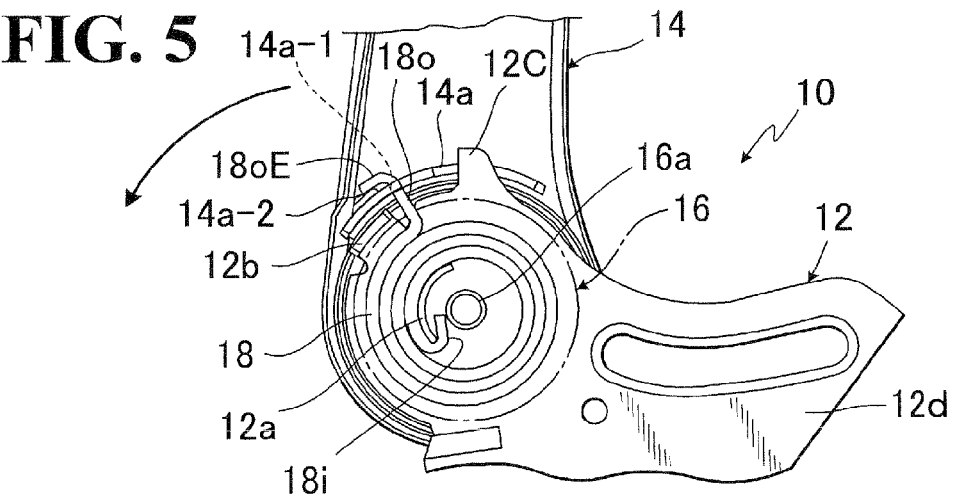
FIG. 5 is a partly broken elevational side view showing an initial state of the principal part, wherein a movable outward end portion of spiral spring element is engaged with a first engagement element.

In this regard, more specifically, the first engagement element (14a) is formed with a recessed region (14a-1) in the backward end thereof, and also formed with an upwardly protrudent region (14a-2) in the forward end portion thereof. The recessed region (14a-1) has a width substantially equal to a width of the movable outward end portion (18o) of spiral spring element (18), and, normally, such particular spring element end portion (18o) is frictionally engaged in and with the recessed region (14a-1), as can be seen in FIGS. 2 and 5. In addition thereto, the horizontal distal end part (18oE) of the spiral spring element (18) is frictionally contacted with the upwardly protrudent region (14a-2).

On the other hand, as shown, the second engagement element (12b) is formed integrally in the upper outer edge of the base plate (12) at a predetermined point ahead of and distant from the foregoing movable outward end portion (18o) of spiral spring element (18). In the present invention, the position of such second engagement element (12b) is very important factor in relation to the afore-said first engagement element (14a). To clarify that factor, a description will now be made with regard to a reclinable range of the seat back (SB) as well as a completely folded position of the seat back (SB) upon the seat cushion (SC).

Reference is first made to FIGS. 3 and 4. FIG. 3 shows an upright position of the seat back frame member (14) or seat back (SB), which corresponds to the solid line at (14) in FIG. 4. As understandable from the FIG. 4, the seat back (at 14) may be inclined in forward and backward directions from that upright position within the inclinable range between the forward and backward limit points (FL) and (RL). Namely, those forward and backward limits (FL) and (RL) indicate an ordinary seat back reclinable range within which a user can normally operate the reclining device (16) to adjustingly incline the seat back (SB) at his or her desired angle of inclination.

Also, as understandable by the arrows in FIG. 4, due to the fold-down nature of seat, upon unlocking operation of the reclining device (16), the seat back (at 14 or SB) may be folded forwardly and downwardly under the biasing force of spiral spring element (18), automatically, in a direction from a given position within the above-defined reclinable range toward the seat cushion (SC) at a point designated by (FD) which refers to a completely folded position of the seat back. At that completely folded position (FD), the seat back (SB) extends horizontally and rests on the seat cushion (SC), which is understandable by referring to FIG. 1 and FIG. 4 comparatively. Of course, in such folding operation, the seat back (at 14 or SB) may also be folded from the upright position as in FIG. 3 towards the completely folded position (FD).

Here, as discussed previously, upon the unlocking operation of reclining device (16), the seat back (SB or 14) will be abruptly inclined forwardly and downwardly towards the seat cushion (SC), thus raising the problem that the seat back will hit a user or item seriously.

In accordance with the present invention, the problem is solved by arrangement of the first and second engagement elements (14a) and (12b) with respect to the movable outward end portion (18o) of spiral spring element (18), which will now be described specifically hereinafter.

At first, with reference to FIG. 5, suppose that the seat back (at 14) is set at the upright position. At this point, the movable outward end portion (18o) of spiral spring element (18) is engaged with the first engagement element (14a) and retained thereby at a position forwardly of and spaced a certain distance from the second engagement element (12b). Then, upon unlocking operation of the reclining device (16), the seat back frame member (14) or seat back (SB) is automatically rotated forwardly and downwardly under the biasing force of the spiral spring element (18), as indicated by the arrow in FIG. 5. Simultaneous therewith, the first engagement element (14a), fixed to that seat back frame member (14), is naturally displaced in the likewise forward and downward direction, with the movable outward end portion (18o) of spiral spring element (18) being kept in frictional engagement with the recessed region (14a-1) of that first engagement element (14a). Of course, the horizontal distal end part (18oE) of spiral spring element (18) is also kept in frictional contact with the protrudent region (14a-2) of the first engagement element (14a).

Figure 6:
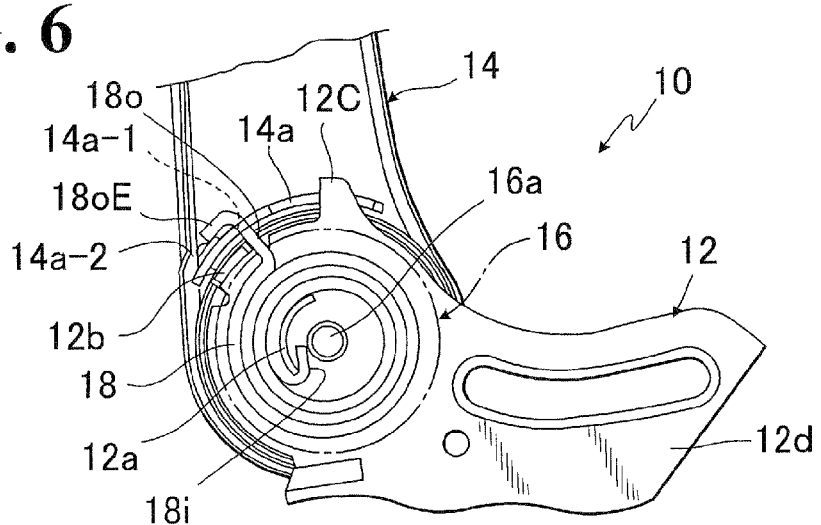
FIG. 6 is a partly broken elevational side view showing a temporary stop of seat back, wherein the foregoing movable outward end portion is engaged with a second engagement element.
Figure 7:
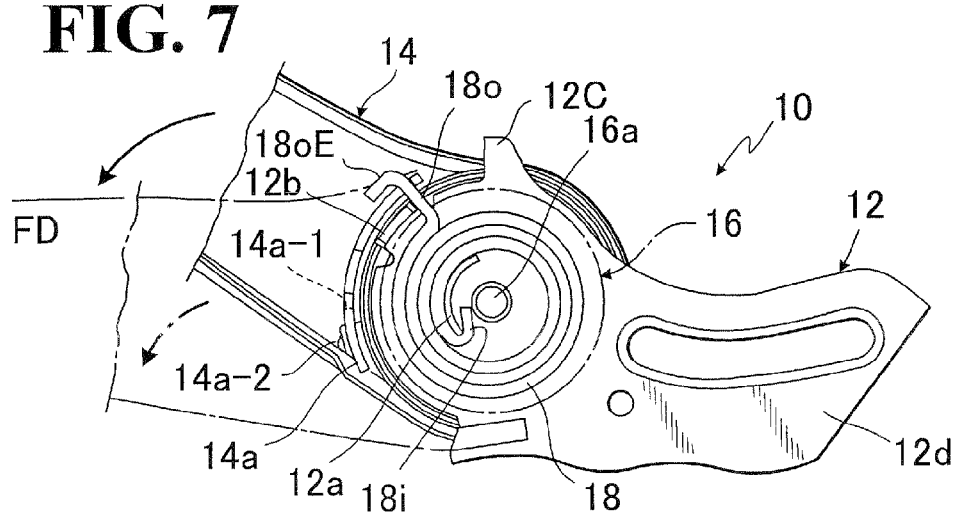
FIG. 7 is a partly broken elevational side view for showing how the seat back is folded down towards a seat cushion.

As a result thereof, the movable outward portion (18o) of spiral spring element (18) is now brought to direct engagement with the second engagement element (12b), as seen in FIG. 6, whereby the biasing force of spiral spring element (18) that has been applied to the first engagement element (14a) is completely blocked by that second engagement element (12b). Consequently, the seat back frame member (14) is now released from the biasing action of spiral spring element (18), which means that any biasing force is no longer applied to the seat back frame member (14) and therefore the forward and downward inclination of seat back (SB) is stopped. Namely, the seat back (SB) is temporarily stopped at a predetermined point slightly distant from the upright position, wherein such predetermined point, as seen in FIG. 6 for example, shall be referred to as a "temporary stop point" hereinafter.

At that temporary stop point, it is noted that the movable outward end portion (18o) of spiral spring element (18) is still frictionally engaged with the recessed region (14a-1) of first engagement element (14a), while the horizontal distal end part (18oE) thereof is also kept in a frictional contact with the protrudent region (14a-2) of the first engagement element (14a), which effectively serves to retain the seat back (SB) against movement at the temporary stop point.

During such temporarily stopped state of seat back (SB), a user can check to see the seat cushion (SC), and, after having ascertained that nothing is on the seat cushion (SC), the user has to simply push the seat back (SC) forwardly by using a relatively small force overcoming the previously described frictional forces created among the spiral spring element outward end portions (at 18o and 18oE) and the first engagement element portions (at 14a-1 and 14a-2). As a result, the seat back (SB) is automatically folded down towards the seat cushion (SC) under the gravity and rests thereon as indicated by the two-dot chain line in FIG. 1.

Conversely when it is desired to return the thus-folded seat back (SB) up to the normal use position as in FIG. 3, the user can easily unfold and raise the seat back (SB) with a relatively small force from the seat cushion (SC), because of no biasing force being applied thereto, so that he or she can continue to return the seat back (SB) up to the upright position or to a desired point in the ordinary reclinable range between the forward and backward limit points (FL) and (RL).

From the descriptions above, in accordance with the present invention, it is to be appreciated that:—

(i) One second engagement element (12b) is simply provided to the base plate (12) in the conventional fold-down seat structure, which not only makes the structure much simplified, but also can block application of biasing force of the spiral spring element (18) to the seat back (SB) at a predetermined point (i.e. the temporary stop position) distant from the folded down position (FD). Thus, upon unlocking operation of the reclining device (16), the upper end portion (18o) of spiral spring element (18) comes to direct engagement with the second engagement element (12a), thereby releasing the seat back (SB) from the biasing force of the spiral spring element (18) at that predetermined point. This insures that the seat back (SB) is temporarily stopped and prevented from being abruptly folded down onto the seat cushion (SC).

(ii) The second engagement element (12b) may be formed in the base plate (12) at a desired point in relation to the first engagement element (14a) fixed on the side of seat back (SB), thereby defining a desired distance between that particular second engagement element (12b) and the movable upper end portion (18o) of spiral spring element (18). This in turn defines a desired range of biasing force of the spiral spring element (18) to the seat back (SB). In other words, the biasing force of spiral spring element (18) may be effective within a range between the backward limit point (RL) of seat back (SB) and a given position of the second engagement element (12b). In this respect, for example, such biasing force range may be defined in correspondence with the previously stated reclining range between the forward and backward limit points (FL) and (RL), by forming the second engagement element (12b) at a point corresponding to the forward limit point (FL) in the base plate (12). In that case, the seat back (SB) is to be released from the basing force of spiral spring element (18) at the forward limit point (FL) and thus temporarily stopped thereat. This arrangement is normally made in most cases.

(iii) In addition, even if a seat occupant or item is on the seat cushion (SC) and the seat back (SB) happens to be inclined from the foregoing temporary stop point towards the seat cushion (SC), the seat back (SB) is slowly and gently inclined therefrom towards the seat cushion (SC) due to the previously described frictional relation between the spiral spring element outward end portions (at 18o and 18oE) and the corresponding local portions of first engagement element (at 14a-1 and 14a-2), whereby the seat occupant or item will receive no great impact from the seat back (SB).

While having described the present inventing thus far, it should be understood that the invention is not limited to the illustrated embodiment, but any modification, replacement and addition may be applied thereto, without departing from the appended claims.

What is claimed is:

1. A structure of automotive seat of fold-down type allowing a seat back thereof to be folded down onto a seat cushion thereof, comprising:
   a seat back frame member provided in said seat back;
   a base plate disposed at said seat cushion;
   said seat back frame member being rotatably connected with said base plate so as to be rotatable relative to the base plate in either of a forward direction of said automotive seat and a backward direction of said automotive seat;
   a limit means for defining a backward limit point for limiting inclination of said seat back frame member in said backward direction of said automotive seat;
   a first engagement element formed in said seat back frame member;
   a second engagement element formed in said base plate, said second engagement element being disposed at a predetermined point distant from said first engagement element in said forward direction of said automotive seat;
   a spiral spring element adapted for giving a biasing force to said seat back frame member to thereby biasingly cause said seat back to rotate in said forward direction of said automotive seat towards said seat cushion;

and said spiral spring element having: a stationary inward end portion defined centrally thereof, said stationary inward end portion being securely connected with said base plate; and a movable outward end portion defined circumferentially thereof, said movable outward end portion being releasably engaged with said first engagement element;

wherein said biasing force of said spiral spring element is effectively applied to said seat back frame member in so far as said particular seat back frame member is positioned within a range between said backward limit point and said predetermined point, and wherein rotation of said seat back frame in said forward direction causes simultaneous displacement of said first engagement element, which in turn allows said movable outward end portion of said spiral spring element to be displaced under said biasing force, together with said first engagement element, in a direction toward said second engagement element, and then, engagement of said movable outward end portion with said second engagement element blocks application of said biasing force to seat back frame member, whereupon said seat back is stopped temporarily at said predetermined point, while on the other hand allowing said first engagement element to be disengaged from said movable outward end portion of the spiral spring element, to thereby allow said seat back frame or said seat back to be folded down from said predetermined point towards said seat cushion.

2. The arrangement as claimed in claim 1, which further comprises a reclining device operatively connected between said seat back frame member and said base plate, said reclining device having a means for defining a forward limit point for limiting rotation of said seat back frame in said forward direction of said automotive seat, wherein said limit means for defining said backward limit point is also provided in said reclining device, wherein said reclining device is operable to adjustingly incline said seat back frame member or said seat back within a predetermined range between said forward limit point and said backward limit point, and wherein said forward limit point corresponds to said predetermined point where said second engagement element is disposed.

* * * * *